No. 702,528. Patented June 17, 1902.
G. T. BAPPE.
COIL SPRING WEED HOOK.
(Application filed Apr. 2, 1902.)
(No Model.)

Witnesses
R. A. Boswell
A. L. Hough

Inventor
Geo. T. Bappe,
By Franklin N. Hough
Attorney

UNITED STATES PATENT OFFICE.

GEORGE THOMAS BAPPE, OF MOVILLE, IOWA.

COIL-SPRING WEED-HOOK.

SPECIFICATION forming part of Letters Patent No. 702,528, dated June 17, 1902.

Application filed April 2, 1902. Serial No. 101,126. (No model.)

*To all whom it may concern:*

Be it known that I, GEORGE THOMAS BAPPE, a citizen of the United States, residing at Moville, in the county of Woodbury and State of Iowa, have invented certain new and useful Improvements in Coil-Spring Weed-Hooks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in attachments for shovel or disk cultivators, and comprises a coil-spring weed-hook which is adjustably held upon a vertical post to the beam of a cultivator and provided at its lower end with an adjustable coil-spring having one end thereof flexible and projected at right angles to form an arm adapted to engage with and turn over the weed at a location in advance of the shovel.

The invention consists, further, in various details of construction, which will be hereinafter fully described and then specifically defined in the appended claims.

My invention is clearly illustrated in the accompanying drawings, which, with the letters of reference marked thereon, form a part of this specification, and in which drawings—

Figure 1:
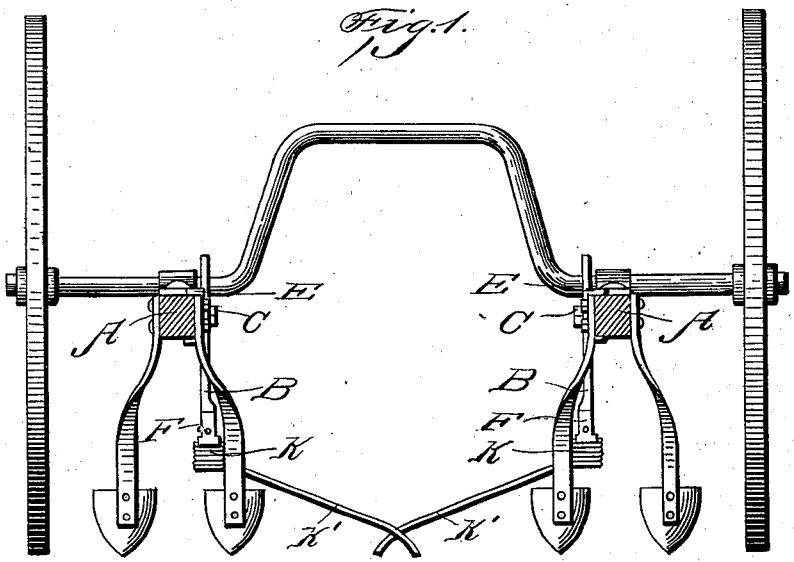
Figure 2:
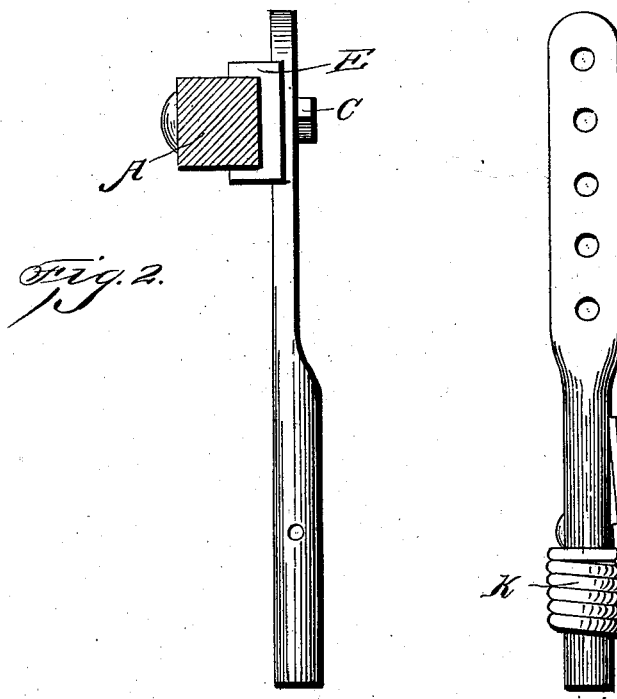
Figure 3:
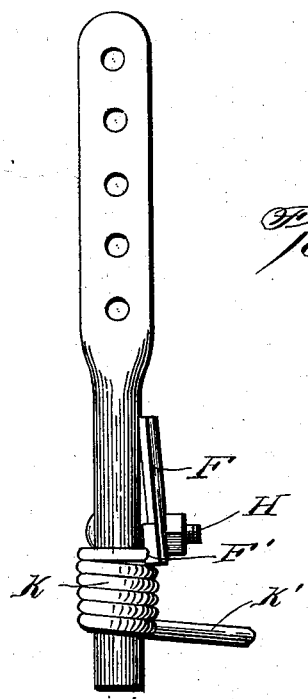

Figure 1 is a perspective view of a cultivator, showing my invention attached thereto. Fig. 2 is an enlarged detail view of one of the posts, and Fig. 3 is a detail view showing the means for adjusting the coil-spring weed-hook to the post carrying the same.

Reference now being had to the details of the drawings by letter, A A designate the beams of an ordinary cultivator, which may be either a shovel or disk cultivator, and at any suitable locations, preferably in advance of the shovel or disk, as the case may be, is mounted a post B, having a series of perforations therein, and C designates a bolt which is adapted to be passed through any one of said perforations and also through a registering aperture in the beam of the cultivator. E designates a plate which is centrally apertured to receive said bolt and has its opposite longitudinal edges flanged and adapted to fit over the upper and lower edges of the bar of the cultivator. The lower end of said post is preferably rounded, and F designates a clamping-jaw which has a groove F' about the concaved face of its jaw portion, and H designates a bolt passed through an aperture in said rounded portion, which bolt passes through said clamping-jaw and is provided for the purpose of holding the clamping end of said jaw in engagement with the end of the coil-spring K, which may be held about the lower end of said post in any suitable position. One end of said coil-spring is bent to form a flexible arm K', adapted to project laterally from the post and serve as a means for turning the weeds in advance of the turning-plow and is adapted to extend adjacent to the plants which are being cultivated.

From the foregoing it will be observed that by the use of my improved weeder attachments means are provided whereby the arms and the posts carrying said arms may be raised or lowered to adapt the same for operation at different elevations and may be easily applied to or detached from the beams of a cultivator.

Having thus fully described my invention, what I claim as new, and desire to secure by Letters Patent, is—

1. A weeder attachment for cultivators, comprising a post adapted to be held to the beam of a cultivator and vertically adjustable, and a coil-spring having a flexible end held to said post, as set forth.

2. An attachment for cultivators comprising a vertically-adjustable post, a coil-spring detachably held upon the end of said post and having a flexible arm adapted to project at right angles from the post, as set forth.

3. In combination with a cultivator-beam, a perforated post, a plate carried by the beam, and the bolt passing through said bolt, plate and beam, a jaw mounted upon said post, and a coil-spring about the lower end of said post, and held thereto by said jaw, an end of said spring being bent to form a flexible arm at right angles to the post, as set forth.

In testimony whereof I affix my signature in presence of two witnesses.

GEORGE THOMAS BAPPE.

Witnesses:
A. H. BYRKIT,
GEO. H. FLYNN.